United States Patent
Wang et al.

(10) Patent No.: US 9,167,449 B2
(45) Date of Patent: Oct. 20, 2015

(54) DYNAMIC CELL CLUSTERING

(71) Applicant: BlackBerry Limited, Waterloo (CA)

(72) Inventors: Yiping Wang, Allen, TX (US); Yi Song, Plano, TX (US); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 139 days.

(21) Appl. No.: 13/962,634

(22) Filed: Aug. 8, 2013

(65) Prior Publication Data

US 2015/0043390 A1 Feb. 12, 2015

(51) Int. Cl.
*H04W 24/02* (2009.01)
*H04L 5/14* (2006.01)

(52) U.S. Cl.
CPC ........ *H04W 24/02* (2013.01); *H04L 5/14* (2013.01)

(58) Field of Classification Search
None
See application file for complete search history.

(56) References Cited

U.S. PATENT DOCUMENTS

| | | | | |
|---|---|---|---|---|
| 2006/0195576 | A1* | 8/2006 | Rinne et al. | 709/226 |
| 2013/0242726 | A1* | 9/2013 | Zhu et al. | 370/229 |
| 2013/0242812 | A1* | 9/2013 | Khoryaev et al. | 370/278 |
| 2013/0272170 | A1* | 10/2013 | Chatterjee et al. | 370/280 |
| 2013/0301423 | A1* | 11/2013 | Sirotkin et al. | 370/241.1 |
| 2013/0322235 | A1* | 12/2013 | Khoryaev et al. | 370/229 |
| 2014/0146696 | A1* | 5/2014 | Lin et al. | 370/252 |
| 2014/0204783 | A1* | 7/2014 | Lin et al. | 370/252 |
| 2014/0307591 | A1* | 10/2014 | Wang et al. | 370/278 |
| 2014/0334347 | A1* | 11/2014 | Wei | 370/278 |

OTHER PUBLICATIONS

3GPP ETSI TS 136.211 v11.3.0: "LTE; Evolved Universal Terrestrial Radio Access (E-UTRA); Physical Channels and Modulation"; Jul. 2013.
3GPP ETSI TS 136.331 v11.3.0: "LTE: Evolved Universal Terrestrial Radio Access (E-UTRA); Radio Resource Control (RRC) Protocol specification"; Apr. 2013.
Catt, Ericsson, St-Ericsson; 3GPP TSG-RAN Meeting #51; RP-110450, "New study item proposal for further enhancements to LTE TDD for DL-UL interference management and traffic adaptation"; Kansas City, USA; Mar. 15-18, 2010.
Catt; 3GPP TSG RAN WG1 Meeting #69; R1-122879, "Evaluation on TDD UL/DL reconfiguration with interference mitigation in multi-cell Pico scenario"; Prague, Czech Republic, May 21-25, 2012.
Catt; 3GPP TSG RAN WG1 Meeting #69; R1-122061, "Discussion on interference mitigation schemes for FS_LTE_TDD_eIMTA"; Prague, Czech Republic, May 21-25, 2012.
Intel Corporation; 3GPP TSG-RAN WG1 Meeting #68bis; R1-121529, "Performance analysis of DL-UL interference management and traffic adaptation in multi-cell Pico-Pico deployment scenario"; Jeju, Korea, Mar. 26-30, 2012.
3GPP TR 36.828 v11.0.0: "Evolved Universal Terrestrial Radio Access (E-UTRA); Further enhancements to LTE Time Division Duplex (TDD) for Downlink-Uplink (DL-UL) interference management and traffic adaptation"; Jun. 2012.

* cited by examiner

*Primary Examiner* — Hong Cho
(74) *Attorney, Agent, or Firm* — Fish & Richardson P.C.

(57) ABSTRACT

In some implementations, a method for dynamic cell clustering includes splitting, by an initial central coordinator, the cluster into two or more clusters in response to a message from a small cell in a cluster. The initial cluster includes a plurality of cells, including the small cell, with each cell assigned a same Time Division Duplex (TDD) configuration.

18 Claims, 12 Drawing Sheets

DYNAMIC CELL CLUSTERING

TECHNICAL FIELD

This disclosure relates to dynamic cell clustering.

BACKGROUND

Long-Term Evolution (LTE) Time Division Duplex (TDD) provides a more flexible deployment than LTE Frequency Division Duplex (FDD) since LTE TDD does not require paired spectrum resources. In the current LTE specification, LTE TDD allows asymmetric Uplink/Downlink (UL/DL) allocations using seven semi-statically configured UL/DL configurations. The rate of change among different TDD configurations is semi-static because the system information provides the updates. Thus, a change in the TDD configuration is limited to a time scale of minimum of 640 milliseconds (ms). While the allocations can provide between 40% to 90% DL subframes, the semi-static UL/DL allocation may not match the instantaneous traffic situation. This mismatch is exacerbated in small cells deployment (e.g., malls, stadiums). For example, the number of UEs in small cells are typically small (e.g., less than 10 UEs), but, even though the traffic behavior of each UE tends to be similar, the traffic behavior may vary quickly over time. In these instances, this variance may lead to the overall traffic ratio of UL to DL changing rapidly. For example, different cells may behave differently at different periods or mass-calling events, or where the number of user equipment (UEs) in the cell is small. Though, neighboring cells may use different UL/DL configurations, which give rise to interference among eNodeBs (eNBs) and interference among UEs. A cell clustering interference mitigation (CCIM) scheme can provide an effective way to deal with these types of interference.

In general, a cell cluster can comprise one or more cells. The UL/DL TDD configuration for all cells within each cell cluster are identical, so that eNB-to-eNB interference and UE-to-UE interference can be mitigated within the cell cluster. Transmission directions in cells belonging to different cell clusters can be different in a subframe by selecting different UL/DL TDD configurations independently. In this way, the benefits of dynamic TDD UL/DL reconfiguration can be achieved. At the same time, by forming the cell clusters, eNB-to-eNB and UE-to-UE interference between cells in different cell clusters can be reduced.

DETAILED DESCRIPTION

Figure 1:
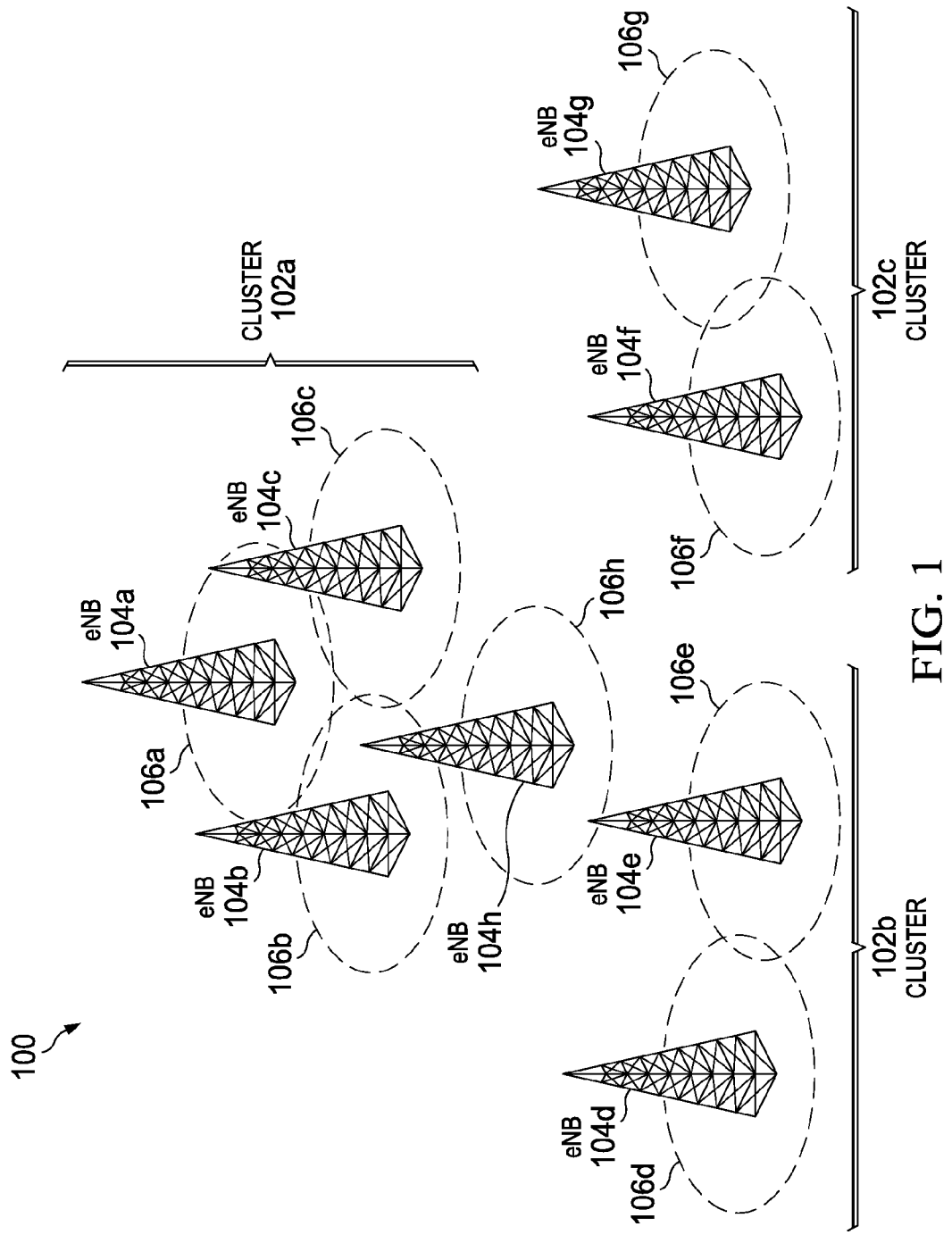
FIG. 1 is an example communication system 100 for dynamic cell clustering.

The present disclosure is directed to a system and method for dynamic cell clustering. For example, a central coordinator for a cluster may split a cell cluster into multiple clusters or merge multiple clusters into a single cluster in response to measured information in one or more cells. A central coordinator manages cells within a cluster, such as assigning a UL/DL TDD configuration for the cells. In some implementations, a central coordinator may be an evolved node B (eNB) for a macro cell, an eNB for a small cell, multiple eNBs for multiple small cells, a gateway, or others. Measured information may include at least one of path loss, interference (e.g., received signal strength from neighboring cells), traffic statistics (e.g., buffer status, packet delay, amount of traffic on DL and UL), or other information. Traffic statistics may also be referred to as traffic pattern. In regard to splitting clusters, the central coordinator may break or otherwise split a cluster to increase the adaptation flexibility with changing traffic conditions. For example, the cluster may be broken or otherwise split into two or more smaller clusters to better match UL/DL transmissions in the two or more smaller clusters. In some implementations, a cluster may be split based on one or more of the following: (1) when one small cell in the cluster is deactivated; (2) when one small cell in the cluster reduces transmission power; (3) when the traffic pattern changes in one or more cells within a cluster; or (4) others. In response to cell deactivation, or to the reduction of transmission power in a cell, the central coordinator may split an original cluster into smaller clusters. The network throughput may be increased because different UL/DL resource allocations may be implemented in the smaller clusters. In some implementations, the isolation between two clusters may not be sufficient to split the original cluster, so some interference mitigation techniques, such as using common direction subframes, power control, and resource planning may be executed. In regard to merging clusters, if a newly activated cell causes less isolation between clusters, a central coordinator may merge two or more cell clusters and the newly activated cell into a single cluster, which can operate under the same UL/DL TDD configuration. In addition, the central coordinator may merge two or more clusters if the eNB inference level exceeds a predefined threshold, which can be caused when loading increases at edge cells.

In general, dynamically adjusting cell clusters due to changes in interference and traffic patterns can be implemented by one or more of the following: a new X2 message to exchange the dynamic TDD reconfiguration; a coordinator cell to facilitate the cluster management, which may simplify dynamic cluster management especially when there is no macro overlay coverage; a new X2 message to change the coordinator cell of each cluster in the cluster splitting process;

determining the middle-cell(s) UL/DL TDD configuration to facilitate the cluster splitting and associated messages; interference mitigation to alleviate interference caused by cluster splitting; or others. Dynamic cell clustering can provide one or more of the following benefits: splitting an existing cluster into multiple clusters may allow different UL/DL TDD configurations to be used to better fit the traffic patterns of each cluster; addressing sudden changes in traffic patterns in one cell which may include handing over UEs to surrounding cells and using a different TDD configuration in the cell; cluster merging due to new cell activation; interference based cell clustering which may provide more flexibility for traffic adaptation; or others.

FIG. 1 illustrates an example communication system 100 for dynamic cell clustering. In the illustrated implementation, the communication system 100 includes cell clusters 102a-c. The communication system 100 shown in FIG. 1 may include one or more network nodes (e.g., 104a-h). The network nodes may take several forms in a mobile communication system, such as (but not limited to) an eNB, a base station, a Node B, a wireless access point, a radio network controller, a base transceiver station, a layer two relay node, a layer three relay node, a femto cell, a home eNB (HeNB), a home Node B (HNB), a base station controller, or other network node that includes radio resource control. In the LTE example of FIG. 1, the network nodes are eNBs 104a-h. In the illustrated implementation, the cluster 102a includes the eNBs 104a-c that typically operate using the same TDD configuration, and the cluster 102b includes eNB 104d and 104e that typically operate using the same TDD configuration. Also, the cluster 102c includes the eNB 104f and 104g that typically operate using the same TDD configuration. The eNBs 104a-h are communicably coupled through a wired or wireless connection (e.g., X2 interface). The eNBs 104a-h have service areas or cells 106a-h, respectively, and serve UEs in the cells 106a-h. The cells 106a-g may be macro cells or small cells. In the illustrated implementation, the cell 106h is a small cell.

In some implementations, the clusters 102a-c include central coordinators for managing clusters such as assigning TDD configurations for the clusters 102a-c. The central coordinator for each of the clusters 102a-c may be one of the eNBs 104a-h. For example, the central coordinators may be the following: (1) eNB 104a for cluster 102a; (2) eNB 104d for cluster 102b; and (3) eNB 104f for cluster 102c. In this example, the eNB 104a, d, and f determine whether to split a single cluster into multiple clusters or merge two or more of the clusters 102a-c based on traffic patterns or interference in the small cells of their respective clusters. In regard to splitting clusters, the cluster 102a may have originally included cells 106a-h, and, in response to a change in traffic pattern or interference in the small cell 106h, the central coordinator 104a may have split the original cluster 102a into the illustrated clusters 102a-c. For example, the central coordinator 104a may have formed the illustrated clusters 102a-c in response to, for example, deactivation of the small cell 106h or a change in the traffic pattern in the small cell 106h. Small cells such as small cell 106h are usually deployed in a more dynamic environment as compared to macro cells. In some instances, small cell deployments can be unplanned. The system 100 may capture variations of the perceived radio environment in these dynamic environments and make adjustment to clusters in response to the variations. Due to the variations in system loading and traffic patterns of the small cells (e.g., 106h), the system 100 may execute a clustering algorithm to adapt to these variations, which can enable different TDD configurations for split clusters. Dynamic realignment of the cells 106a-h may be event-driven or once every predefined time period, and the event driven may have less signaling than the predefined time period.

In regard to merging, the clusters 102a-c may merge into a single cluster in response to, for example, activation of the small cell 106h or a traffic pattern in the small cell 106h. In either case, the central coordinators 104a, d, and f may determine that the small cell 106h has activated or changed the traffic pattern and coordinate a merger of the clusters 102a-c. When merging the clusters 102a-c, the central coordinators 104a, d, and f may determine a central coordinator for the merged clusters 102a-c. In some implementations, the clusters 102a-c do not have individual coordinators, and rather one coordinator may manage all the cells in the three clusters.

Turning to a general description of the system 100, FIG. 1 is a schematic representation of an example wireless communication system 100 based on 3GPP LTE, also known as Evolved Universal Terrestrial Radio Access (E-UTRA). The cellular network system 100 shown in FIG. 1 includes a plurality of base stations 104a-h. As previously mentioned, the base stations are shown as eNBs 104a-h. The eNBs 104a-h may operate in any mobile environment, including femto cell or pico cell, or the eNBs 104a-h may operate as a node that can relay signals for other mobile and/or base stations. The example LTE telecommunications environment 100 may include one or a plurality of radio access networks, core networks (CNs) (e.g., an Evolved Packet Core (EPC)), and external networks. In certain implementations, the radio access networks may be Evolved Universal Mobile Telecommunications System (UMTS) terrestrial radio access networks (E-UTRANs). In addition, in certain instances, the core networks may be evolved packet cores (EPCs). Further, there may be one or more UEs operating within the LTE system 100. In some implementations, 2G/3G systems (e.g., Global System for Mobile communication (GSM), Interim Standard 95 (IS-95), Universal Mobile Telecommunications System (UMTS), CDMA2000 (Code Division Multiple Access)) may also be integrated into the LTE telecommunication system 100.

In the example LTE system, an E-UTRAN includes eNBs 104a-h, which directly communicate with UEs. The eNBs 104a-h may be the end point of the radio protocols towards UEs and may relay signals between the radio connection and the connectivity towards a core network (not illustrated). In certain implementations, an Evolved Packet Core may be the main component of a core network. The core network may include a backbone network, which may be a central part of the mobile communication system 100. The core network may include other components, such as (but not limited to) a mobility management entity (MME), a serving gateway (SGW), and/or a packet data network gateway (PGW). The MME may be the main control element in the core network responsible for the functionalities comprising the control plane functions related to subscriber and session management. The SGW can serve as a local mobility anchor, such that the packets are routed through this point for intra-radio access network (e.g. intra-EUTRAN) mobility and mobility with other legacy 2G/3G systems. The SGW functions may include the user plane tunnel management and switching. The PGW may provide connectivity to the services domain comprising external networks, such as the IP networks. The UEs, the radio access network (e.g. E-UTRAN), and core network (e.g., EPC) are sometimes referred to together as the evolved packet system (EPS).

Figure 2:
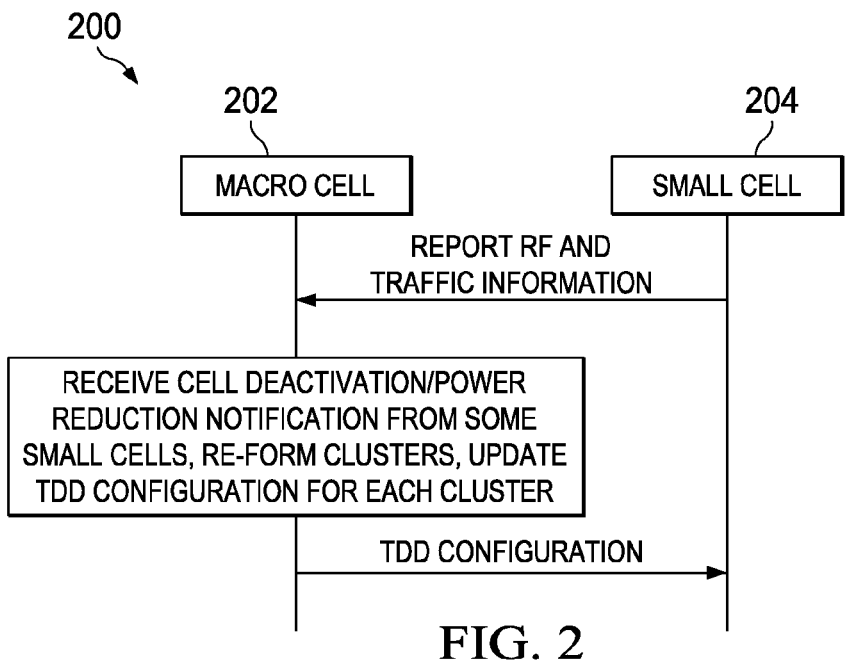
FIG. 2 is a call flow 200 directed to an example procedure of cluster splitting with macro coverage.
Figure 6:
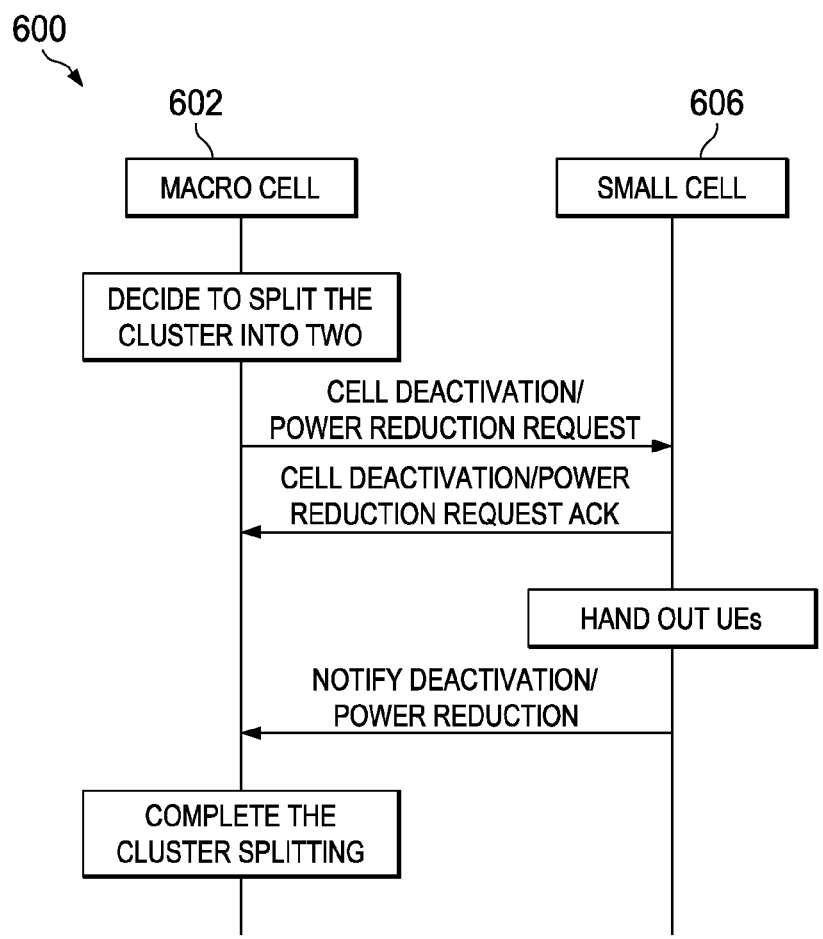
FIG. 6 is a call flow illustrating an example procedure for cluster splitting due to traffic adaptation with macro coverage.
Figure 3:
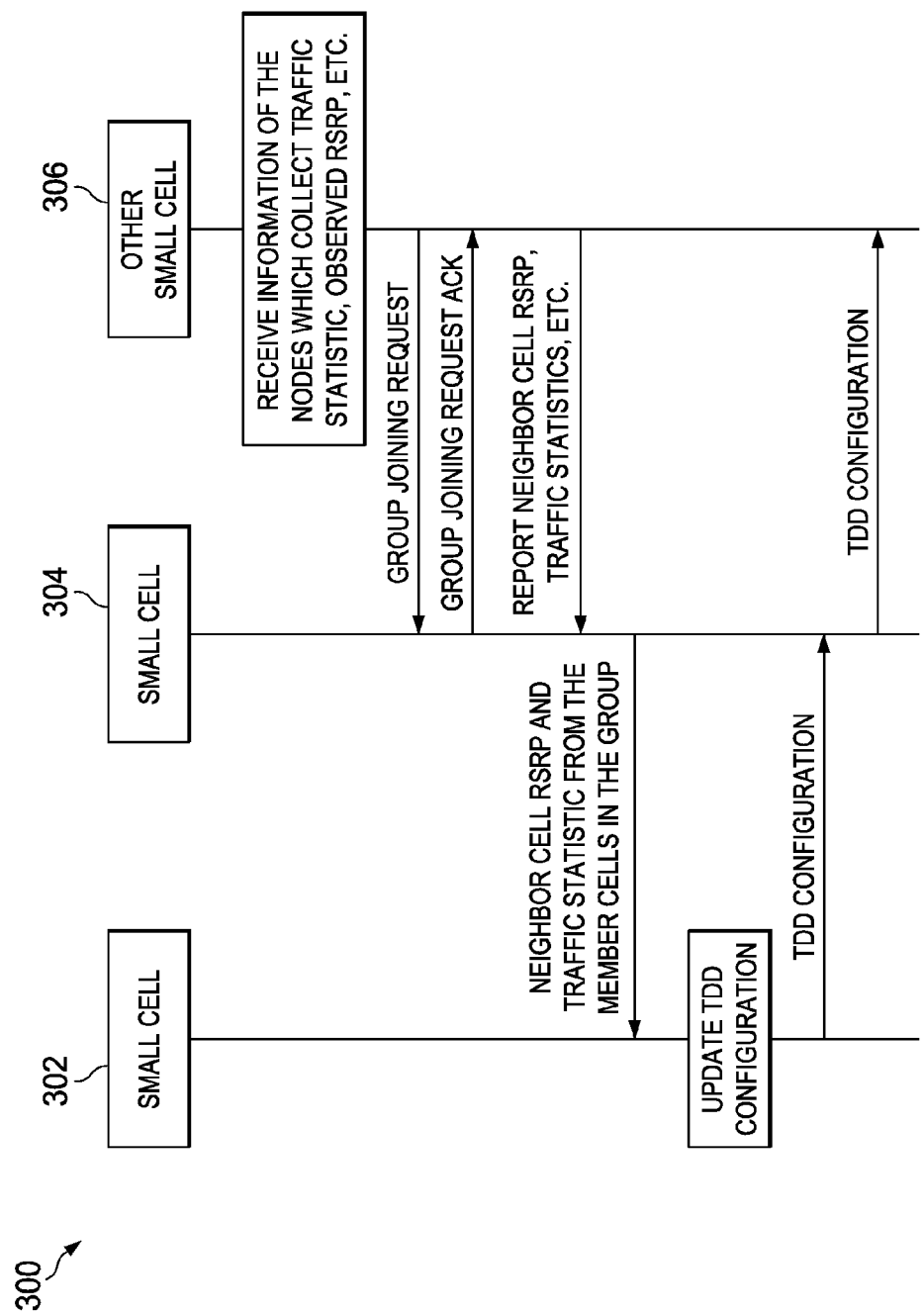
FIG. 3 is a call flow illustrating an example procedure for dividing central-coordinator tasks among multiple small cells.
Figure 4:
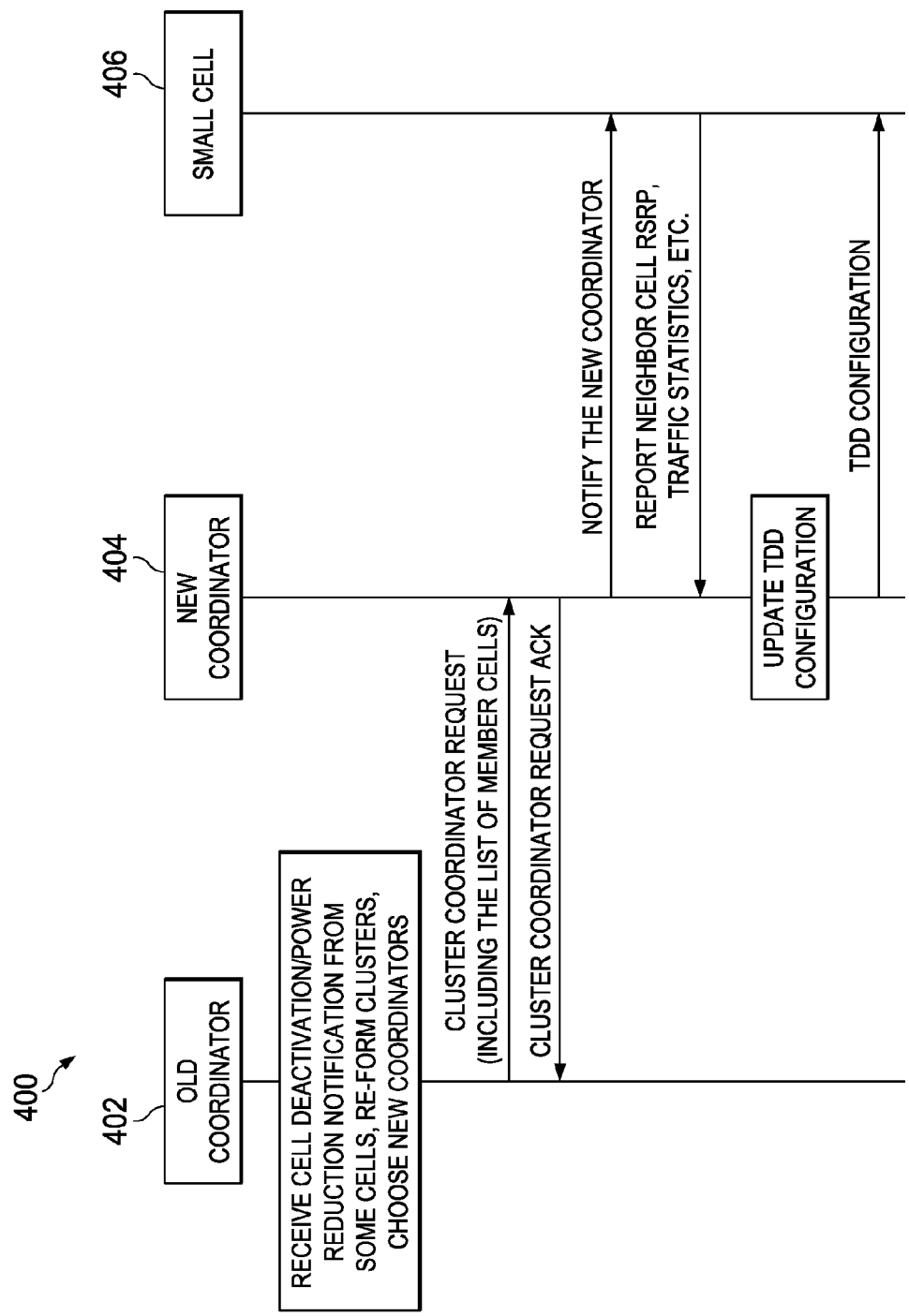
FIG. 4 is a call flow illustrating an example procedure for cluster splitting without macro coverage.
Figure 5:
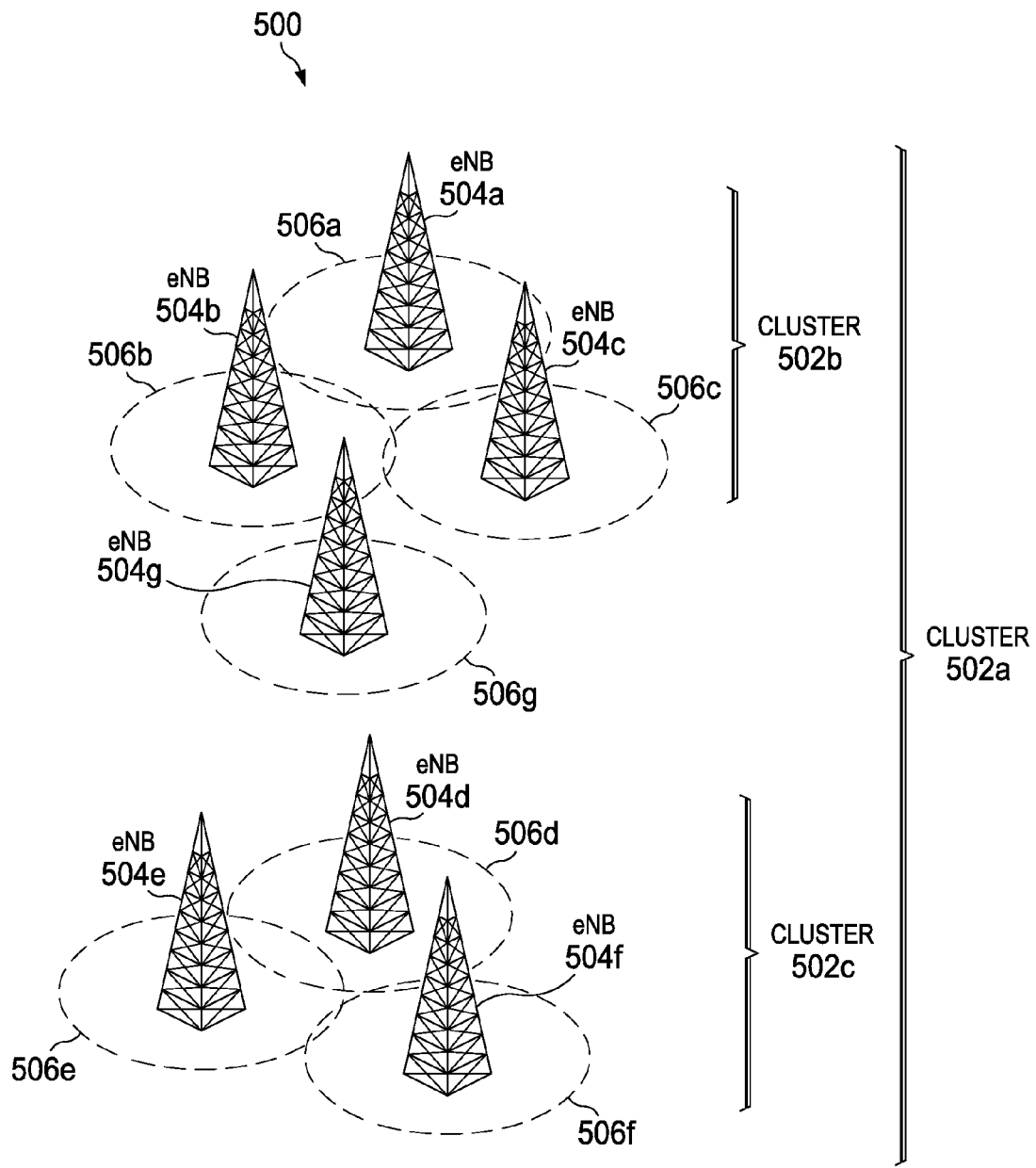
FIG. 5 is an example communication system for splitting an original cluster into two smaller clusters.
Figure 7:
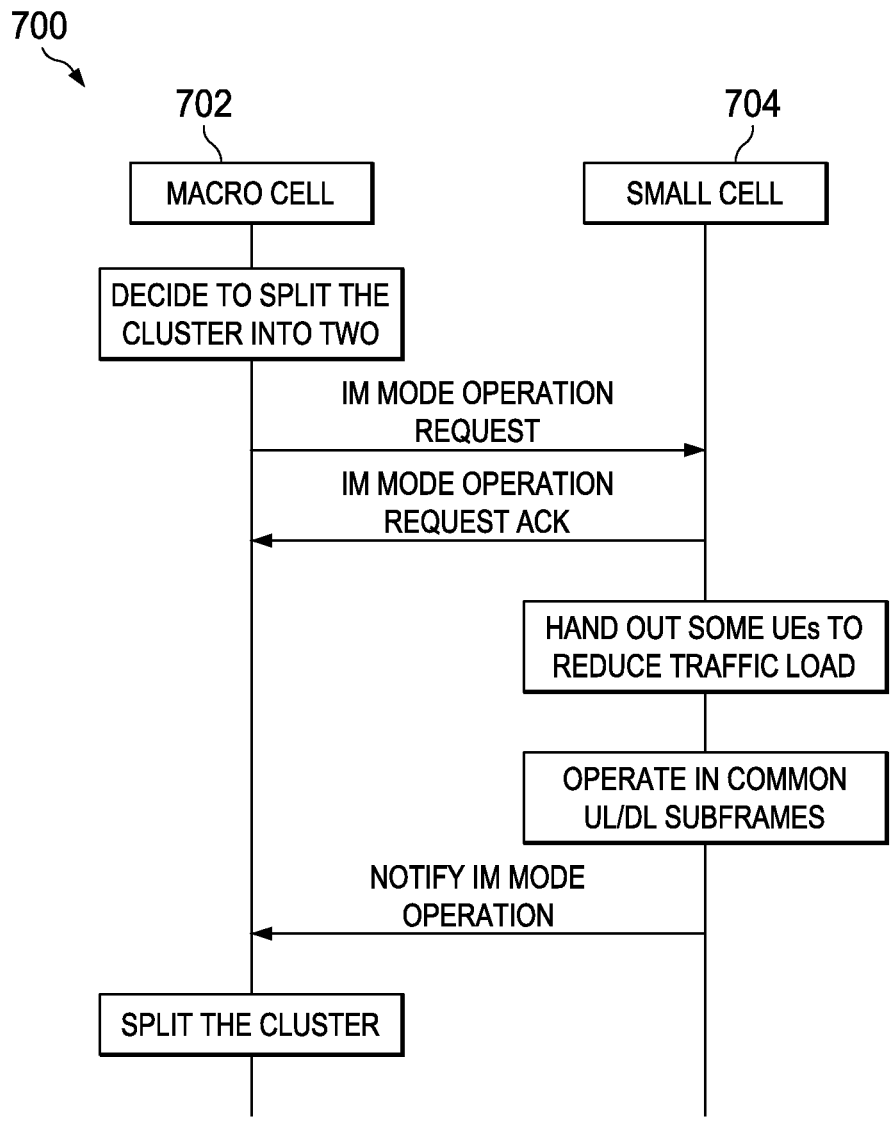
FIG. 7 is a call flow illustrating an example procedure for cluster splitting using interference mitigation method.

FIGS. 2-9 are directed to cluster splitting due to small-cell deactivation or traffic adaption, and FIGS. 10-14 are directed to cluster merging due to small-cell activation or interference from edge cells. In regard to cluster splitting, FIGS. 2-4 are example call flows 200, 300, and 400 directed to cluster splitting due to small-cell deactivation or transmission power reduction, and FIGS. 5-7 illustrate an example communication system 500 and call flows 600 and 700 directed to cluster splitting due to traffic adaptation. When a small cell deactivates services, e.g., to better match the traffic situation, one cluster may be split into multiple clusters as discussed above in regard to FIG. 1. Also, splitting an original cluster into smaller clusters can increase the traffic adaptation flexibility because different UL/DL TDD configurations can be applied to different clusters.

In regard to FIG. 2, the call flow 200 is directed to an example procedure of cluster splitting with macro coverage. As illustrated, the call flow 200 illustrates communication between a macro cell 202 acting as the central coordinator and a small cell 204. Initially, the macro cell 202 may receive, from each small cell (e.g., 204), a report indicating at least one of cell deactivation, observed path loss, received signal strength (e.g., RSRP) from neighboring cells, or traffic statistics. The macro cell 202 can determine whether to split a cluster as well as determine the appropriate TDD configuration for each cluster. The macro cell 202 then signals the TDD configuration to each small cell including the small cell 204. If the small cell cluster is under the coverage of multiple macro cells, one of the macro cells may be the central coordinator.

If the traffic loadings on some small cells get low, these small cells may turn off to save energy and reduce interference in the system. For example, if the small cell 204 is in the middle (e.g., 106h in FIG. 1), and the traffic loading gets below a predefined threshold, this small cell 204 may handover serviced UEs to either neighboring small cells or the overlaid macro cell 202 and deactivates when all serviced UEs are handed over. In general, a cell may be in the middle of a cluster when at least a portion of the cell is between at least two other cells such as the small cell 204 (e.g., 106h in FIG. 1). The small cell 204 may notify the macro cell 202 about the deactivation using, for example, the existing X2 message eNB Configuration Update. Once the macro cell 202 receives the deactivation message, the macro cell 202 may re-form the clusters (e.g., 102a-c in FIG. 1), determine the TDD configuration for each cluster, and signal the TDD configuration to each small cell including the small cell 204. As an alternative to cell deactivation, the small cell 204 may reduce the transmit power, i.e., reduce the cell size. If the small cell 204 reduces power to save energy, the small cell 204 may notify the macro cell 202 about the amount of power reduction. In response to the power reduction, the macro cell 202 may re-form the clusters based on the current interference and traffic conditions.

With dynamic TDD configuration change, when an eNB signals another eNB on the X2 interface regarding the assigned TDD configuration, the eNB may need to signal two TDD configurations. In particular, eNB may signal a TDD configuration broadcasted in the System Information Block 1 (SIB1) for the eNB and a dynamic TDD configuration. The SIB1 TDD configuration may be used for backward compatibility purposes because legacy UEs may not recognize the dynamic TDD configuration signaling. The Subframe Assignment in the existing X2 message Information Element (IE) Served Cell Information may be linked to UL/DL TDD configuration in the SIB1. As one example shown in Table 1, an additional IE may be included to signal the dynamic TDD configuration.

Table 1 illustrates a modified Served Cell Information. As illustrated, the modified Served Cell Information includes IE/Group names that identify various information elements within the message. To assist in dynamic TDD configuration, the modified Served Cell Information includes a new IE/Group name labeled "Dynamic Subframe Assignment" (see the last row under TDD Info), which signals the dynamic TDD configuration. Though, the modified Served Cell Information is merely an example message for signaling the dynamic TDD configuration, and other messages may be used to signal the dynamic TDD configuration.

TABLE 1

| IE/Group Name | Presence | Range | IE type and reference | Semantics description | Criticality | Assigned Criticality |
|---|---|---|---|---|---|---|
| PCI | M | | INTEGER (0 ... 503, ... ) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | | |
| >>>UL EARFCN | M | | EARFCN 9.2.26 | Corresponds to $N_{UL}$ in ref. TS 36.104 [16] | — | — |
| >>>DL EARFCN | M | | EARFCN 9.2.26 | Corresponds to $N_{DL}$ in ref. TS 36.104 [16] | — | — |
| >>>UL Transmission Bandwidth | M | | Transmission Bandwidth 9.2.27 | | — | — |
| >>>DL Transmission Bandwidth | M | | Transmission Bandwidth 9.2.27 | Same as UL Transmission Bandwidth in this release | — | — |

TABLE 1-continued

| IE/Group Name | Presence | Range | IE type and reference | Semantics description | Criticality | Assigned Criticality |
|---|---|---|---|---|---|---|
| >TDD | | | | | — | — |
| >>TDD Info | | 1 | | | — | — |
| >>>EARFCN | M | | 9.2.26 | Corresponds to $N_{DL}/N_{UL}$ in ref. TS 36.104 [16] | — | — |
| >>>Transmission Bandwidth | M | | Transmission Bandwidth 9.2.27 | | — | — |
| >>>Subframe Assignment | M | | ENUMERATED (sa0, sa1, sa2, sa3, sa4, sa5, sa6, . . . ) | Uplink-downlink subframe configuration information defined in ref. TS 36.211 [10] | — | — |
| >Dynamic Sub frame Assignment | O | | ENUMERATED (sa0, sa1, sa2, sa3, sa4, sa5, sa6, . . . ) | Uplink-downlink subframe configuration information defined in ref. TS 36.211 [10] | | |
| >>>Special Subframe Info | | 1 | | Special subframe configuration information defined in ref. TS 36.211 [10] | — | — |
| >>>>Special Subframe Patterns | M | | ENUMERATED (ssp0, ssp1, ssp2, ssp3, ssp4, ssp5, ssp6, ssp7, ssp8, . . . , ssp9) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

In particular, the modified Served Cell Information includes IE/Group Name "Dynamic Subframe Assignment" to convey the dynamic TDD configuration.

In cases without macro coverage, a single small cell, multiple small cells, or a gateway (GW) may perform tasks of the central coordinator, which may be configured by, for example, Operations Administration and Maintenance (OAM) messaging. In regard to FIG. 3, the call flow 300 illustrates an example procedure for dividing the task of central coordinator among multiple small cells when the small cells do not have macro coverage. In the call flow 300, the task of central coordinator is divided among small cells 302 and 304. While the small cell 304 is illustrated as a single cell, the tasks of the small cell 304 may be distributed among multiple small cells. When a cluster includes many small cells, the small cells separate into multiple groups where the task of central coordinator is shared among multiple cells (e.g., 302 and 304). In the illustrated example, the small cell 304 collects information from small cells such as neighbor cell reference symbol resource power (RSRP), traffic statistics, observed path loss, and other information, and passes the collected information to the small cell 302. The small cell 302 determines TDD configurations for the cluster based on the collected information. Initially, the small cell 306 is notified using, for example, OAM or X2 messages that the small cells 302 and 304 perform the tasks of the central coordinator. For example, the small cell 306 may be notified via OAM that the small cell 304 collects traffic statistics and observed path loss. The small cell 306 transmits, to the small cell 304, a request to join the group. If the request is turned down due to limited capability/capacity, the small cell 304 may send the request to another node. As illustrated, the small cell 304 acknowledges the request, and the small cell 306 reports the neighbor cell RSRP, traffic statistics, and other information to the small cell 304. The small cell 304 transmits the information collected from the member cells in the group to the small cell 302. The small cell 302 determines the TDD configuration for the small cells 302, 304, and 306 and transmits the TDD configuration to the small cells 304 and 306.

In comparison, a single small cell may be the central coordinator. Similarly, the central coordinator may be configured by, for example, OAM, and the small cells in the cluster can be notified of the central coordinator using OAM or X2 messages. When a small cell is deactivated or reduces power for energy saving, the small cell may notify the central coordinator about the deactivation or power reduction. The central coordinator can re-form the clusters (e.g., split one cluster into multiple clusters), determine the TDD configuration for each cluster, and signal each small cell about the TDD configuration. Due to limited capability, capacity, or reliability of a small cell, a reliable entity in the system other than a small cell may serve as the central coordinator. For example, if a small-cell GW (gateway) is employed in the network, (i.e., the small cells are connected to a GW that, in turn, connects to the core network), the GW may serve as the central coordinator.

In regard to FIG. 4, the call flow 400 illustrates an example procedure for cluster splitting without macro coverage. In particular, the call flow 400 illustrates an old coordinator 402 selecting a new coordinator 404 for a newly formed cluster that includes a small cell 406. After receiving a cell deactivation or power reduction notification, the old coordinator 402 splits a cluster into smaller clusters and selects a coordinator for each smaller cluster (e.g., 404). In some instances, the old coordinator 402 can send a Cluster Coordinator Request message (which may be a new X2 message) to determine whether the new coordinator 404 is capable of being a coordinator. The old coordinator 402 may provide the list of member cells to assist when making the determination. If the new coordinator 404 is capable of being a coordinator, the new coordinator 404 can notify member cells (e.g., 406) regarding a change in the coordinator. This notification may be a new X2 message as well. Alternatively, Table 2 illustrates a modified field of Served Cell Information in Served Cells To Modify of the existing X2 message eNB Configuration Update can be modified.

Table 2 below illustrates an example of a modified Served Cell Information. The modified Served Cell Information includes IE/Group names that identify various information elements within the message. To assist in the dynamic cell clustering, the modified Served Cell Information includes new IE/Group names labeled "Cluster member cell list" to identify member cells and "ECGI" to identify the cell in the cluster (see the last two rows in Table 2). Though, the modified Served Cell Information is merely an example message for signaling the member cells, and other messages may be used to signal for the dynamic cell clustering.

TABLE 2

| IE/Group Name | Presence | Range | IE type and reference | Semantics description | Criticality | Assigned Criticality |
|---|---|---|---|---|---|---|
| PCI | M | | INTEGER (0 ... 503, ... ) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN Identity | M | | 9.2.4 | | | |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in ref. TS 36.104 [16] | — | — |
| >>>DL EARFCN | M | | EARFCN 9.2.26 | Corresponds to $N_{DL}$ in ref. TS 36.104 [16] | — | — |

TABLE 2-continued

| IE/Group Name | Presence | Range | IE type and reference | Semantics description | Criticality | Assigned Criticality |
|---|---|---|---|---|---|---|
| >>>UL Transmission Bandwidth | M | | Transmission Bandwidth 9.2.27 | | — | — |
| >>>DL Transmission Bandwidth | M | | Transmission Bandwidth 9.2.27 | Same as UL Transmission Bandwidth in this release | — | — |
| >TDD | | | | | | |
| >>TDD Info | | 1 | | | | |
| >>EARFCN | M | | 9.2.26 | Corresponds to $N_{DL}/N_{UL}$ in ref. TS 36.104 [16] | — | — |
| >>>Transmission Bandwidth | M | | Transmission Bandwidth 9.2.27 | | — | — |
| >>>Subframe Assignment | M | | ENUMERATED (sa0, sa1, sa2, sa3, sa4, sa5, sa6, . . . ) | Uplink-downlink subframe configuration information defined in ref. TS 36.211 [10] | — | — |
| >>>Special Subframe Info | | 1 | | Special subframe configuration information defined in ref. TS 36.211 [10] | — | — |
| >>>>Special Subframe Patterns | M | | ENUMERATED (ssp0, ssp1, ssp2, ssp3, ssp4, ssp5, ssp6, ssp7, ssp8, . . . , ssp9) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING(2) | MBMS ServiceArea Identities as defined in TS 23.003 [29] | | |
| MultibandInfoList | O | | 9.2.60 | | YES | ignore |
| Cluster member cell list | | 0 . . . <maxCellinCluster> | | Being the coordinator of a cluster and the member | | |

TABLE 2-continued

| IE/Group Name | Presence | Range | IE type and reference | Semantics description | Criticality | Assigned Criticality |
|---|---|---|---|---|---|---|
| >ECGI | O | | | cells in the cluster E-UTRAN Cell Global Identifier of the cell in the cluster | | |

In particular, the modified Served Cell Information includes IE/Group Name "Cluster member cell list" to identify member cells and "ECGI" to identify the cell in the cluster.

Once the member cell 406 is notified of the new coordinator 404, the member cell 406 may transmit information indicating observed path loss or received signal strength (e.g., RSRP) from neighboring cells and traffic statistics to the new coordinator 404 for the TDD reconfiguration. In some implementations, the old coordinator 402 can directly notify each small cell (e.g., 406) about the new coordinator 404. In these instances, the old coordinator 402 may use a new type of message. Some small cells may not be capable of being a coordinator. In these instances, the OAM may be used to configure each small cell to have the capability for being a coordinator or not based on the available resources of each small cell. Each small cell may notify neighboring cells of capability of that cell.

FIGS. 5-7 illustrate an example communication system 500 and call flows 600 and 700 directed to cluster splitting due to traffic adaptation. In regard to FIG. 5, the communication system 500 illustrates splitting an original cluster 502a into two smaller clusters 502b and 502c in response to changes in the traffic pattern of the small cell 506g. As illustrated, the original cluster 502a includes cells 506a-g and monitors the traffic pattern in each small cell (e.g., 506). For example, the original cluster 502a may adapt to real-time traffic scenarios by monitoring buffer status and packet delay on both DL and UL. The original cluster 502a monitors the DL buffer status and DL packet delay, and UEs report UL buffer status using, for example, existing Rel. 8 Buffer Status Report (BSR). UL packet delay information may be reported using MAC control element (CE)-based signaling. By monitoring buffer status and packet delay on both DL and UL, the original cluster 502a may be able to adapt the cell UL/DL TDD configuration based on the real-time traffic situation. As previously mentioned, cells within the same cluster typically have the same TDD configuration due to cross-link interference, so in order to achieve more flexible traffic adaptation, the original cluster 502a splits into multiple clusters (e.g., 502b and 502c) in response to traffic patterns. For example, the original cluster 502a may determine that a preferred TDD configuration in cells 506a-c is different from a preferred TDD configuration in the cells 506d-f. In response to the determination, the central coordinator for the cluster 502a may instruct the eNB 504g to handover serviced UEs to neighboring cells. Once the handovers are complete and the cell 506g is deactivated, the central coordinator splits the original cluster 502a into two small clusters 502b and 502c and assigns each of the clusters 502b and 502c different TDD configurations.

In regard to FIG. 6, the call flow 600 illustrates an example procedure for cluster splitting due to traffic adaptation with macro coverage. If small cells (e.g., 606) are under macro coverage, the macro cell 602 may be the central coordinator and each small cell (e.g., 606) reports traffic statistics to the coordinator 602. The macro cell 602 may determine that the preferred TDD configuration in several cells is significantly different from the preferred TDD configuration in several other cells. In response to the determination, the macro cell 602 may decide to split the cluster into two, as indicated in the call flow 602. To make the two clusters not interfere with each other, the macro cell may request a small cell 606 in the middle (e.g., 506g in FIG. 5), to deactivate or reduce power. The macro cell 602 may calculate the amount of power reduction from the eNB-to-eNB RSRP measurement of surrounding cells and signal the amount of power reduction to the middle-cell 606. Before deactivation or power reduction, the cell 606 may handover serviced UEs to either the neighboring small cells or the overlaid macro cell 602. After the deactivation or power reduction, the small cell 606 may notify the macro cell 602 as well as the neighboring small cells about the deactivation or power reduction.

If deactivation or power reduction of the middle-cell 606 does not provide sufficient isolation to split the cluster, the middle-cell 606 (e.g., 506g in FIG. 5), may execute interference mitigation schemes to facilitate the cluster splitting. To reduce interference, a different UL/DL TDD configuration, which may be one of the existing seven configurations (see Table 3), may be applied to the middle-cell 606. Table 3 defines seven different UL/DL configuration schemes in LTE TDD operations.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For example, the different UL/DL TDD configuration may be determined using a configuration-dependent method or configuration-independent method. In regard to the configuration-dependent method, the DL subframes of the middle-cell UL/DL TDD configuration may be the intersection set of DL subframes of surrounding cell cluster configurations except for the cases which involve combinations of configuration 2 and configuration 3 as well as configuration 2 and configuration 4. For the configuration 2 and configuration 3 combination, the different TDD configuration may be configuration 6. For the configuration 2 and configuration 4 combination, the different TDD configuration may be configuration 1. In this process, the special subframe may be considered as a DL subframe. For example, if there are three surrounding cell clusters, cluster 1 with configuration 1, cluster 2 with configuration 2, and cluster 3 with configuration 4, the middle-cell UL/DL TDD configuration may be configuration 1. In determining the different TDD configuration, the surrounding clusters signal their TDD configurations to the middle-cell 606. Alternatively, the different TDD configuration may be included in the "IM mode operation request" message as discussed with regard to FIG. 7. In regard to the configuration independent method, the middle-cell UL/DL TDD configuration may be configuration 0. Among the seven existing TDD configurations illustrated in Table 3, configuration 0 has the fewest number of DL subframes, and the other configurations have a DL subframe in the same location of the DL subframes in configuration 0. When using configuration 0, the middle-cell DL subframes may not cause eNB-to-eNB interference to the surrounding clusters. The UE-to-UE interference may be managed by the eNB scheduler. In this way, the middle-cell DL subframes may not cause cross-link interference to the surrounding clusters.

In regard to FIG. 7, the call flow 700 illustrates an example procedure for cluster splitting using interference mitigation. As illustrated in call flow 700, to reduce interference, the small cell 704 in the middle (e.g., 506g in FIG. 5), may schedule PDSCH/PUSCH transmission only during the common UL/DL subframes of the two cluster TDD configurations (not limited to two clusters, could be more). For example, if cluster 1 uses TDD configuration 0 and cluster 2 uses TDD configuration 2, the middle-cell 704 may schedule PDSCH transmission during subframe 0, 1, 5, and 6 and schedule PUSCH transmission during subframe 2 and 7. As Table 3 illustrates, configuration 0 and configuration 2 have common DL transmissions in subframes 0, 1, 5, and 6 and common UL transmissions in subframe 2 and 7. The small cell 704 in the middle may have a valid TDD configuration (e.g., TDD Configuration 1). In this case, the small cell 704 in the middle may transmit a Cell Reference Symbol (CRS) in all the DL subframes of configuration 1 but schedule PDSCH only during subframe 0, 1, 5, and 6. To accommodate the traffic in the limited subframes, the middle-cell 704 may handover some UEs to the neighboring small cells or the overlaid macro cell 702 to reduce traffic loading. The middle-cell 704 may notify neighboring cells about the common UL/DL subframes that will be used for PDSCH/PUSCH transmission. As an alternative to handing over UEs, when using the common UL/DL transmissions, the middle-cell 704 may schedule UL/DL transmissions for cell-centered UEs to substantially avoid interfering with the two clusters. The middle-cell 704 may also notify neighboring cells about the low transmission power during flexible UL/DL subframes. In the above mentioned methods, the middle-cell 704 may not be limited to a single cell. When the middle includes multiple cells, these cells in the middle may form a middle cluster in some cases, but the same method may be applied to the middle cluster.

In comparison to the call flow 700, if small cells are not under macro coverage, one small cell may be the central coordinator. If the coordinator observes different traffic patterns in the cluster, the small-cell coordinator may decide to split the cluster into two or more clusters. Similar to the case of with macro coverage, the coordinator may signal the small cells at the boundary of the two clusters to schedule PDSCH/PUSCH transmission only during the common UL/DL subframes of the two cluster TDD configurations. The small cells at the boundary of the two clusters may also schedule cell-centered UEs at the non-common UL/DL subframes of the two cluster TDD configurations. Alternatively, in order to split the cluster, the coordinator may request the small cells at the boundary of the two clusters to deactivate or reduce power if their UEs can be handed over to the neighboring small cells.

Figure 8:
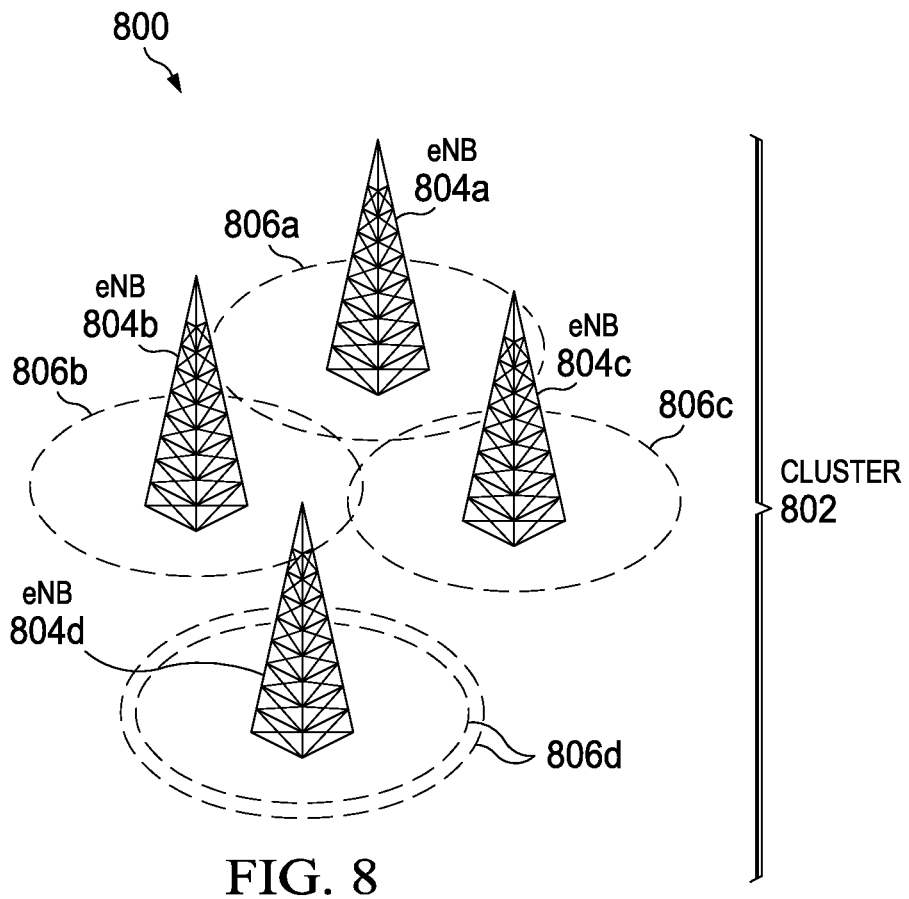
FIG. 8 is an example communication system for cell splitting due to traffic adaptation.
Figure 9:
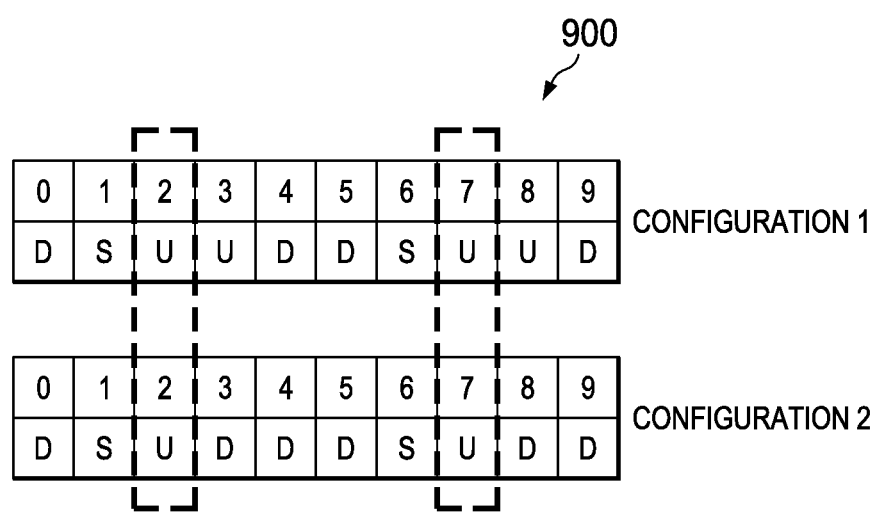
FIG. 9 is a schematic illustrating example TDD configurations.
Figure 10:
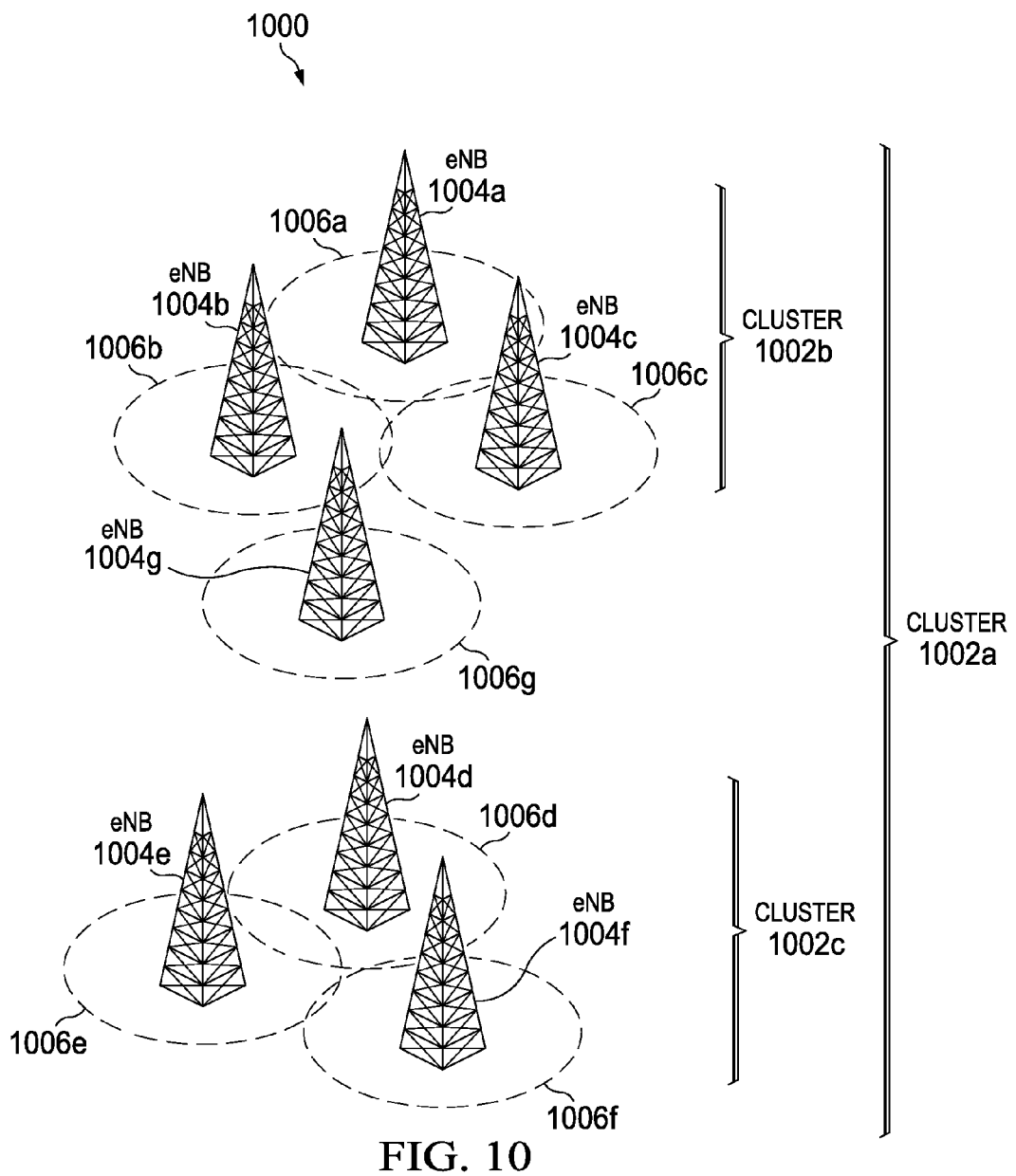
FIG. 10 is an example communication system illustrating merging clusters into a single cluster.

FIGS. 8 and 9 illustrate an example communication system 800 and schematic 900 directed to cell splitting due to traffic adaptation. In regard to FIG. 8, the communication system 800 includes the cluster 802 with the cells 806a-d. The central coordinator for the cluster 802 may determine a change in the traffic pattern for the cell 806d, so the UL/DL configuration may be adapted to better match the traffic situation. For example, the cell 806d may modify the traffic pattern by handing over some UEs and/or by reducing transmission power and splitting from the cluster 802. In regard to handovers, the cell 806d may handover some UEs to (or receive some UEs from) neighboring small cells or an overlaid macro cell. This removal or addition of UEs to the cell 806d may modify the traffic pattern to better match the cluster TDD configuration. From the exchange of X2 message Resource Status Update with neighboring cells, the cell 806d may determine the UL/DL Physical Resource Block (PRB) usage at the neighboring cells (e.g., 806b and 806c) and select a target cell to handover the UEs or receive UEs.

In regard to transmission power, the cell 806d may reduce the eNB transmission power of the cell, which is indicated by the two dotted lines around eNB 804d. The reduced power level may be predefined or defined by higher layer signaling based on the interference situation. In this way, the interference between the cell 806d and surrounding cells (e.g., 806b and 806c) can be controlled after the cell 806d splits from the cluster 802. By splitting the cell 806d from the cluster 802, a different UL/DL TDD configuration may be used in the cell 806d. Reducing transmission power and splitting from the cluster 802 may be used when the cell 806d changes, e.g., to a downlink heavier configuration than the one used by the surrounding cells (e.g., 806b and 806c) in the cluster 802 since the eNB-to-eNB interference is reduced in this scenario. The UE-to-UE interference may be reduced as well by shrinking the cell size. The remaining interference may be managed by the eNB scheduler. In some implementations, cell-edge UEs can be scheduled in the common UL subframes. For example, the UL/DL TDD configuration of the cluster 802 may be configuration 1, and the cell 806d changes to configuration 2. The common UL subframes in this case are subframe #2 and #7, as shown a schematic 900 in FIG. 9. Before reducing the transmission power of the cell, i.e., reducing the cell size, the cell 806d may handover cell-edge UEs to neighboring small cells (e.g., 806b and 806c) or the overlaid macro cell.

FIGS. 10-14 illustrate a communication system 1000, a call flow 1100, a call flow 1200, a communication system 1300, and a call flow 1400 directed to dynamic cluster merging. In particular, the communication system 1000, the call flow 1100, and the call flow 1200 are directed to cluster merging due to a newly activated cell, and the communication system 1300 and the call flow 1400 are directed to cluster merging due to interference. In regard to FIG. 10, the communication system 1000 illustrates merging an original cluster 1002a and an original cluster 1002b into a single cluster 1002c in response to a small cell 1006g activating or increasing transmission power. When the small cell 1006g is activated or increases power (e.g., exiting energy saving), the small cell 1006g may request, from a cell in the cluster 1002a and 1002b, information identifying a central coordinator for the cluster 1002a and 1002b. Using the request information, the small cell 1006g may notify the central coordinator for the cluster 1002a or 1002b, or both, about the activation or power increase. If there is macro coverage, the macro cell may be the central coordinator. If there is no macro coverage, one small cell may be the central coordinator. Regardless, the clusters 1002a and 1002b determine the traffic patterns of the cells 1006a-g, merge the cells 1006a-g into the cluster 1002c if appropriate, and assign a common TDD configuration for the cells 1006a-g based on the traffic patterns.

Figure 11:
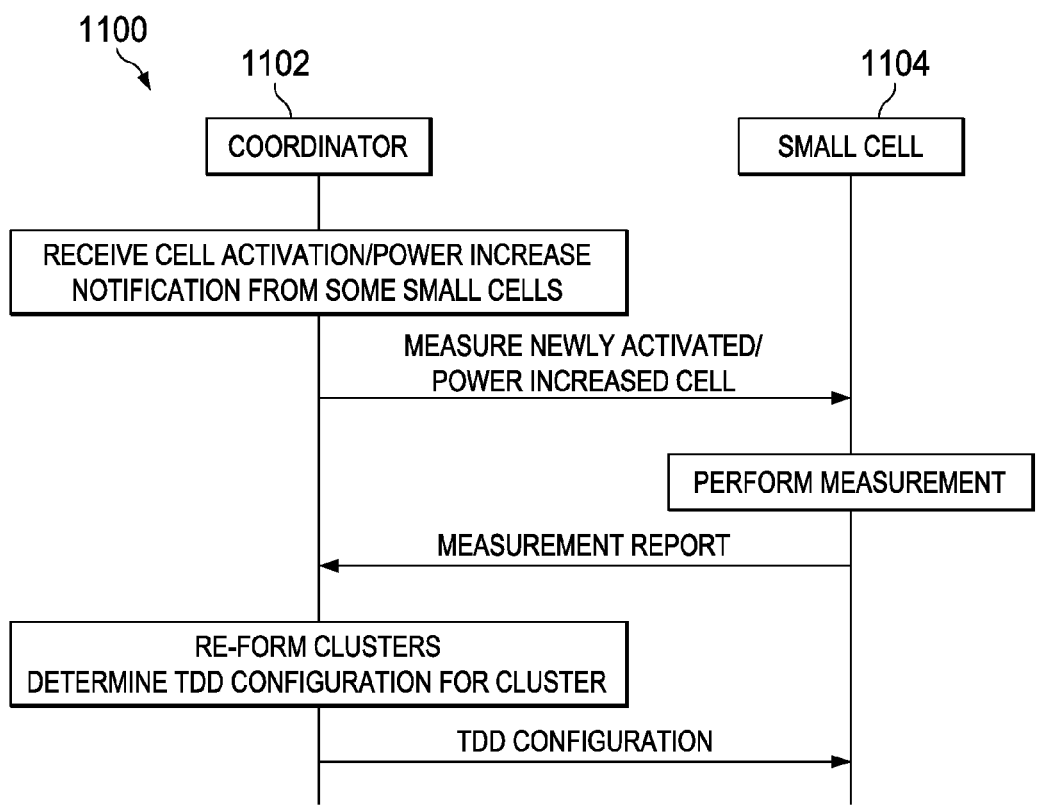
FIG. 11 is a call flow illustrating an example procedure for cluster merging due to cell activation with macro coverage.

In regard to FIG. 11, the call flow 1100 illustrates an example procedure for cluster merging due to cell activation with macro coverage. The call flow 1100 illustrates that a coordinator 1102 receives a cell activation or power increase notification from small cells in the cluster for the coordinator 1102. In response to the notification, the coordinator 1102 transmits a request to the small cell 1104 to measure the newly activated or power-increased cell, and the small cell 1104 transmits a measurement report to the coordinator 1102. Based on the measurements, the coordinator 1102 can reform or merger the clusters (e.g., merge multiple clusters), determine the TDD configuration for the cluster, and signal each small cell (e.g., 1104) about the TDD configuration.

Figure 12:
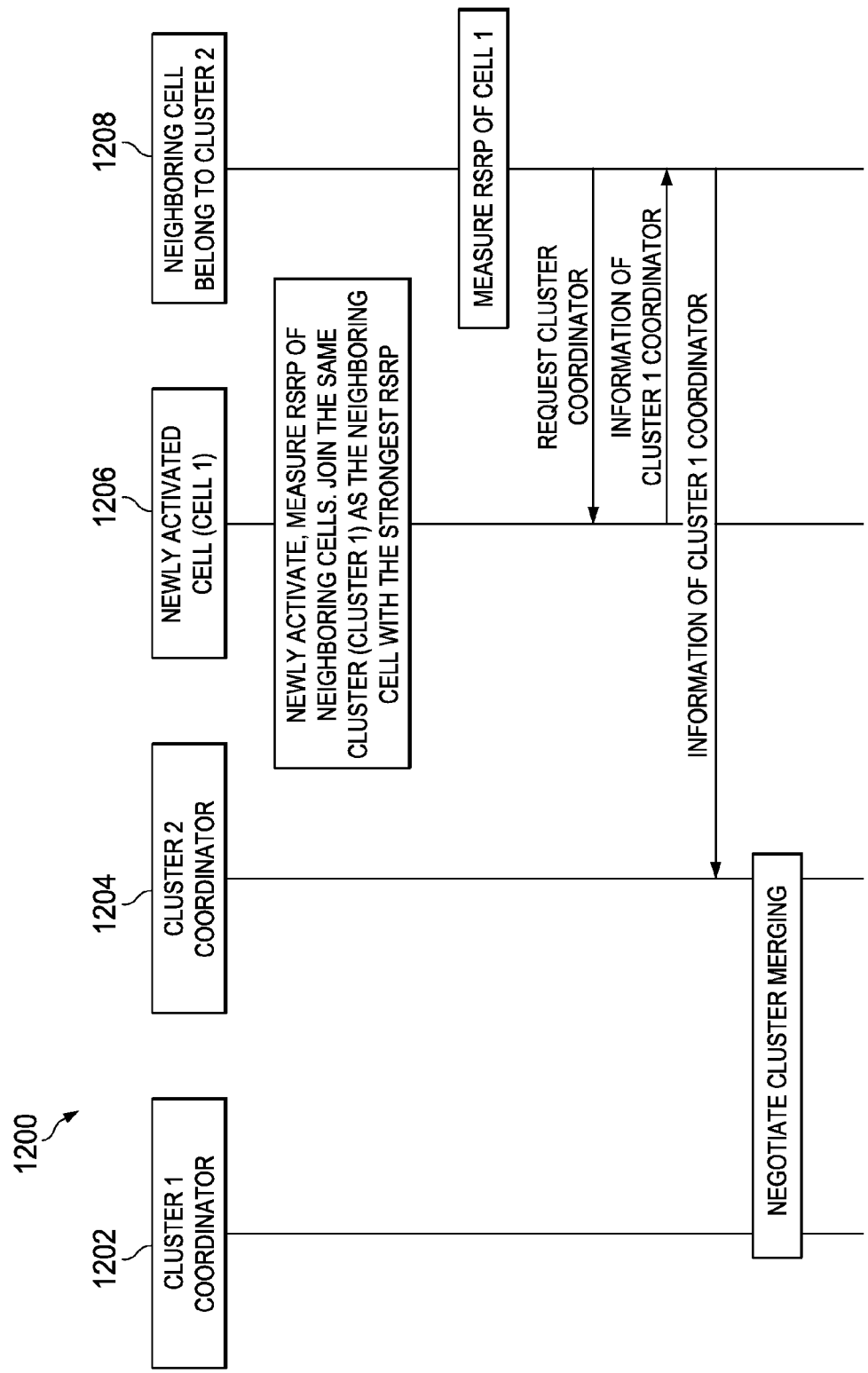
FIG. 12 is a call flow illustrating an example procedure for cluster merging due to cell activation without macro coverage.

In regard to FIG. 12, the call flow 1200 illustrates an example procedure for cluster merging due to cell activation without macro coverage. As previously mentioned, when small cells do not have macro coverage, each cluster has a coordinator, i.e., no central coordinator for the area. When a small cell 1206 is newly activated or increases power, a neighboring cell 1208 in cluster coordinated by 1204 may observe a new RSRP measurement (for the case of newly activated cell 1206) or an increased RSRP measurement (for the case of cell power increase). The cell 1206 may join, or may already be, a member of the cluster for the cluster coordinator 1202. If cell 1208 recognizes cell 1206 as not belonging to the cluster coordinated by 1204 and the observed RSRP measurement is higher than a threshold, the cell 1208 transmits to the cell 1206 on X2 interface a request to identify a cluster coordinator 1202 for the cell 1206. The cell 1208 transmits to the coordinator 1204 a response identifying the coordinator 1202, and the coordinators 1202 and 1204 negotiate on how to merge the two clusters into a single cluster.

Figure 13:
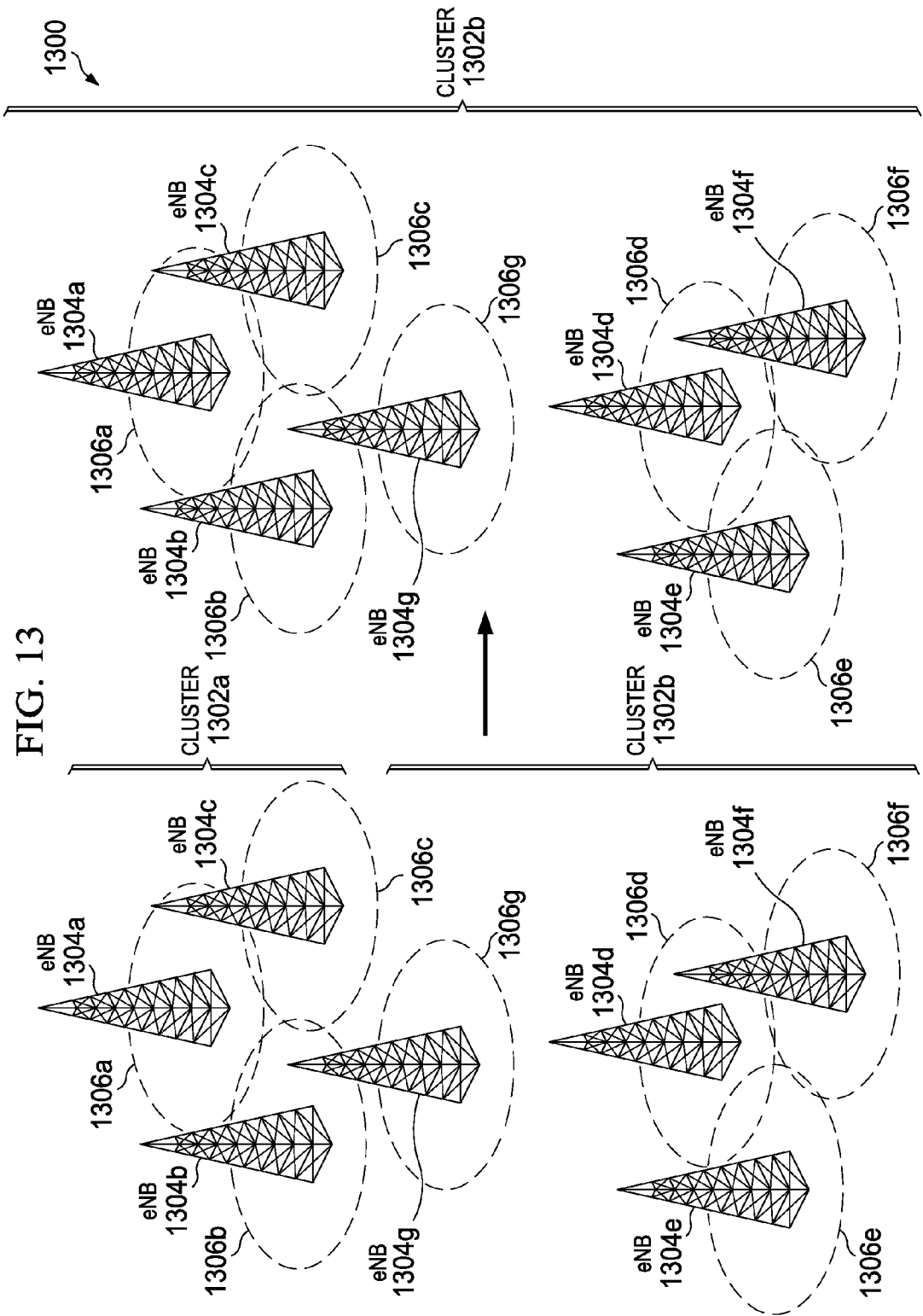
FIG. 13 is an example communication system illustrating merging clusters in response to an increasing load in an edge cell.

In regard to FIG. 13, the communication system 1300 illustrates merging cluster 1302a and 1302b in response to loading increase of an edge cell 1306g. For example, the loading of the edge cell 1306g may increase above a pre-defined threshold, and, in response, the clusters 1302a and 1302b are merged into a single cluster 1302a. Since the UL/DL TDD configuration in the different cell clusters 1302a and 1302b can be independently changed, the inter-cluster interference among the clusters 1302a and 1302b is not only dependent on coupling loss but also on the UL/DL configuration, which may cause substantial cross-link interference. In general, coupling loss is defined as a total long-term fading channel loss over the link between eNB to eNB antenna ports and includes in practice antenna gains, path loss, shadowing, etc. In addition, data traffic transmission may be another source of the overall interference, which is typically more dynamic and dependent on the data traffic loading of the cell.

In this scenario, the eNB interference level may be used to determine whether to form the cell cluster 1302c. Compared with the coupling loss approach, using the eNB interference level may provide more flexibility in traffic adaptation. Even though the cells 1306b-c and 1306g do not meet the coupling loss clustering requirement, the cells 1306b-c and 1306g may have a very low interference level and be able to fit into different clusters 1302a and 1302b when the traffic load is light. In regard to FIG. 13, the cell cluster formation is based on the eNB interference. The cells 1306a-g can form two clusters when the edge cells 1306b-c and 1306g are lightly loaded. However, as the loading increases at the edge cells 1306b-c or 1306g, the eNB total interference may become more significant such that the original two clusters 1302a and 1302b have to be merged into the cluster 1302c to avoid the cross-link interference. In these instances, each of the eNBs 1304a-g may periodically monitor the total interference and send measurement reports to the coordinating cell. The reporting frequency may be defined by the higher layer signaling. The result of interference measurement could be included in the X2 message Resource Status Update as shown in Table 4.

TABLE 4

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ... ) | Allocated by $eNB_1$ | YES | reject |
| eNB2 Measurement ID | M | | INTEGER (1 ... 4095, ... ) | Allocated by $eNB_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |

TABLE 4-continued

| IE/Group Name | Presence | Range | IE type and reference | Semantics description | Criticality | Assigned Criticality |
|---|---|---|---|---|---|---|
| >>Composite Available Capacity Group | O | | 9.2.44 | | YES | ignore |
| >>ABS Status | O | | 9.2.58 | | YES | ignore |
| >>interference measurement result | O | | | | YES | ignore |

In particular, the Resource Status Update includes a new IE/Group Name "interference measurement result" to identify interference measurement results.

Figure 14:
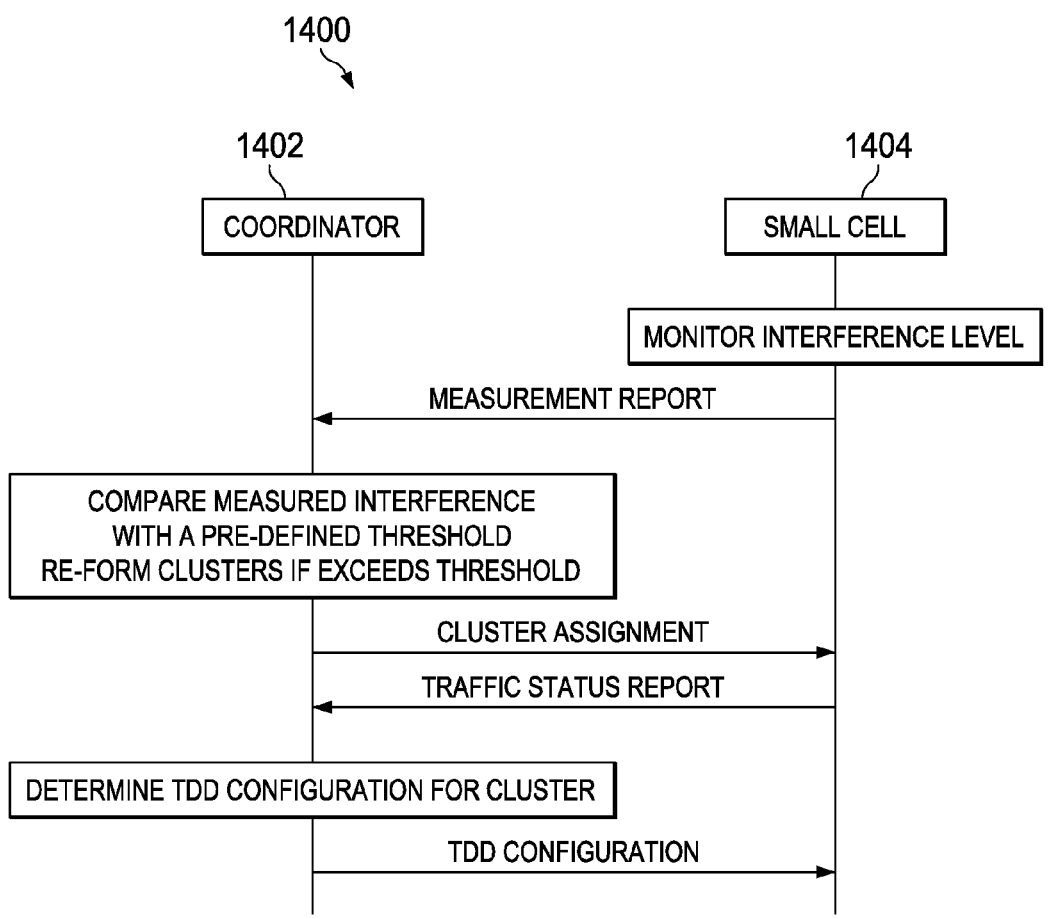
FIG. 14 is a call flow illustrating an example procedure for cluster merging based on interference.

In regard to FIG. 14, the call flow 14 illustrates an example procedure for cluster merging based on interference. For example, the re-clustering may be triggered when an eNB interference level exceeds a predefined threshold, and the central coordinator 1402 may reassign cells to form new a cluster and, based on the traffic situation, determine the UL/DL TDD configuration for the cluster. As illustrated, the small cell 1404 monitors eNB interference and sends a measurement report to the central coordinator 1402. In response to the measurement report, the central coordinator 1402 compares the measured eNB interference to a predefined threshold. If the threshold is exceeded, the cell coordinator 1402 re-forms or otherwise merges clusters and transmits the cluster assignment to each small cell (e.g., 1404). The small cells (e.g., 1404) send traffic status reports to the cell coordinator 1402, which, in turn, determines a TDD configuration for the cluster. The cell coordinator 1402 signals the TDD configuration to the small cells including the small cell 1404.

A number of embodiments of the invention have been described. Nevertheless, it will be understood that various modifications may be made without departing from the spirit and scope of the invention. In some examples, a network node may include one or more processors configured to execute the disclosed methods. In some examples, a computer program product encoded on a non-transitory medium may include computer readable instructions for causing one or more processors to perform the disclosed methods. Accordingly, other embodiments are within the scope of the following claims.

What is claimed is:

1. A method for dynamic cell clustering, the method comprising:
receiving, from a small cell in a cluster, a message that indicates an uplink (UL) buffer status and an UL packet delay; and
splitting, by an initial central coordinator, the cluster into two or more clusters based on the UL buffer status and the UL packet delay, wherein the initial cluster includes a plurality of cells, including the small cell, with each cell assigned a same Time Division Duplex (TDD) configuration.

2. The method of claim 1, further comprising:
for each cluster in the two or more clusters, determining a TDD configuration based on traffic in that cluster, wherein the two or more clusters are assigned different TDD configurations; and
for each cluster in the two or more clusters, signaling the TDD configuration to member cells of the cluster.

3. The method of claim 2, further comprising receiving measurement reports from member cells in the two or more clusters.

4. The method of claim 3, wherein the measurement reports includes at least one of pathloss, received signal strength from neighboring cells, or traffic statistics.

5. The method of claim 1, further comprising:
for each cluster in the two or more clusters, selecting a subsequent central coordinator; and
signaling each subsequent central coordinator information regarding an assigned cluster, wherein each subsequent central coordinator determines a TDD configuration for the assigned cluster based on the information regarding the assigned cluster.

6. The method of claim 1, further comprising signaling different TDD configurations to the two or more clusters.

7. The method of claim 6, wherein at least one of the TDD configurations is a dynamic TDD configuration broadcast using X2 messaging.

8. The method of claim 1, wherein the initial central coordinator comprises an eNodeB (eNB) for macro cell, an eNB for a small cell, multiple eNBs for multiple small cells, or a gateway.

9. The method of claim 1, further comprising determining that a preferred TDD configuration for a first subset of the plurality of cells is different from a preferred TDD configuration for a second subset of the plurality of cells.

10. The method of claim 1, further comprising signaling the small cell to deactivate after handing over UEs or reduce transmit power.

11. The method of claim 1, further comprising signaling a specified TDD configuration to the small cell, wherein the specified TDD configuration reduces eNB-eNB interference.

12. The method of claim 1, wherein the message indicates a change in traffic pattern for the small cell, the method further comprising signaling the small cell to handover specific UEs to modify the traffic pattern, wherein the modified traffic pattern more closely matches the same TDD configuration.

13. The method of claim 1, wherein the message indicates a change in traffic pattern for a small cell, the method further comprising signaling the small cell to reduce power by a specified amount.

14. The method of claim 13, further comprising signaling the small cell to use a different TDD configuration.

15. A method for dynamic clustering, comprising:
receiving, from a small cell in an initial cluster, a message that indicates activation of the small cell or an increase in transmission power; and
merging, by a central coordinator, the initial cluster with one or more clusters into a subsequent cluster based on the activation of the small cell or the increase in transmission power, wherein the subsequent cluster includes a plurality of cells;
determining a same Time Division Duplex (TDD) configuration for the plurality of cells; and for each cell in the plurality of cells, signaling the same TDD configuration.

16. The method of claim 15, wherein the message indicates activation of the small cell or a transmit power increase in the small cell.

17. The method of claim 16, wherein the message indicates a transmit power increase in the small cell, the method further comprising:
   determining the transmit power increase exceeds a specified threshold; and
   transmitting, to the small cell, a request for a central coordinate for the initial cluster.

18. The method of claim 15, wherein the message indicates inference with an eNB for the small cell exceeds a predefined threshold.

* * * * *